J. BATTEY.
Meat Choppers.
No. 135,258. Patented Jan. 28, 1873.
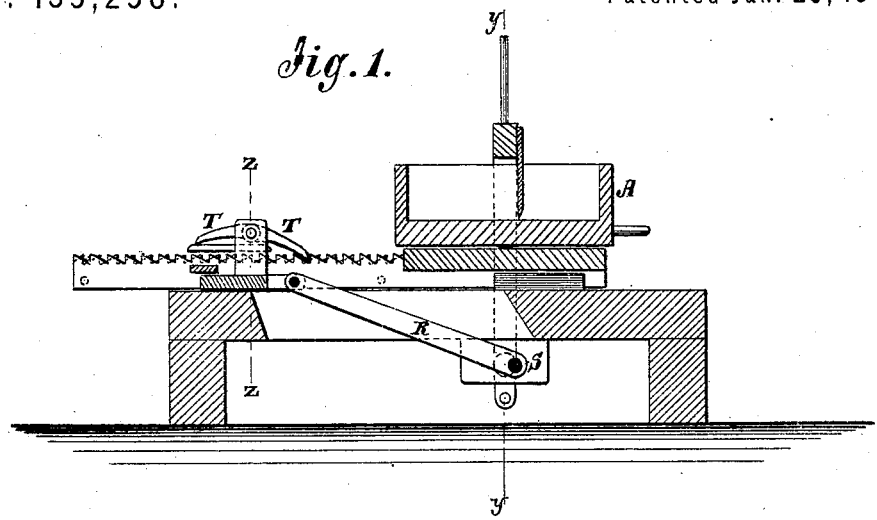
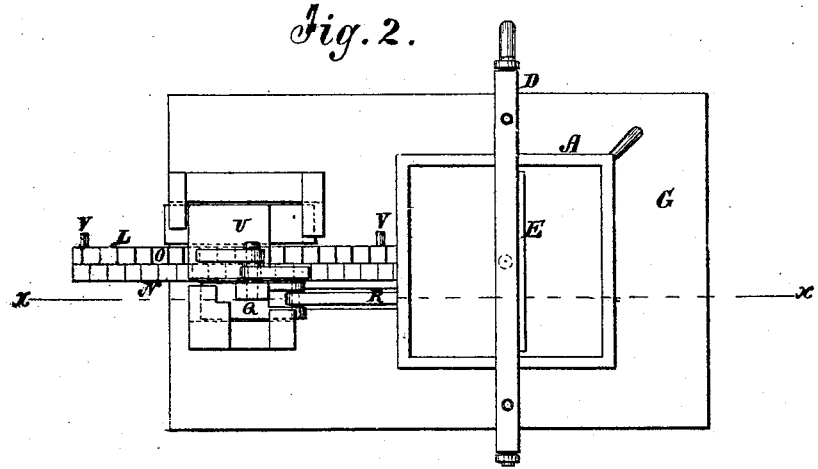
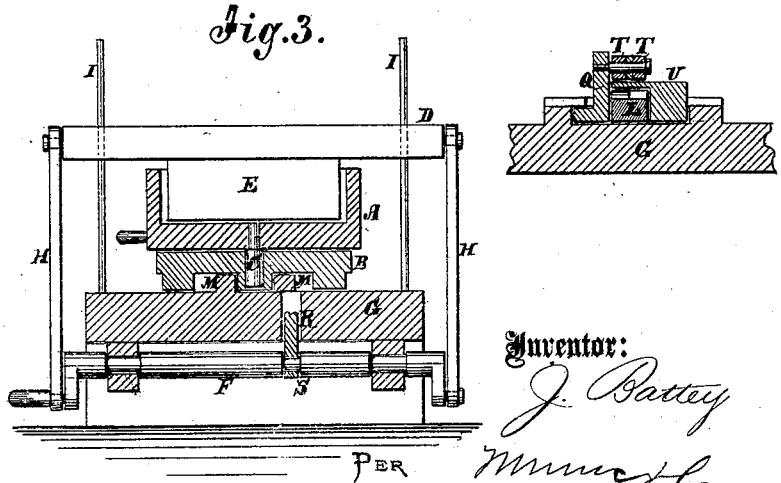
Witnesses:
A. Bennerkendorf.
C. Sedgwick.
Inventor:
J. Battey
per Munn & Co.
Attorneys.

UNITED STATES PATENT OFFICE.

JESSE BATTEY, OF MANCHESTER, NEW JERSEY.

IMPROVEMENT IN MEAT-CHOPPERS.

Specification forming part of Letters Patent No. 135,258, dated January 28, 1873.

*To all whom it may concern:*

Be it known that I, JESSE BATTEY, of Manchester, in the county of Ocean and State of New Jersey, have invented a new and Improved Meat-Chopper, of which the following is a specification:

My invention consists of a novel contrivance of pawls and a shifting device with a ratchet-bar having two sets of ratchet-teeth, reversed as to each other, for moving the chopping-box and reversing it from one direction to the other. My invention also consists of an intermittingly-reciprocating square chopping-box, combined with a vertically-moving blade and a carrier for the box, in such manner that the box can be turned a quarter of a revolution, and thereby be presented to the blade so that the meat will be chopped crosswise.

Figure 1 is a longitudinal sectional elevation of my improved meat-chopper taken on the line $x\,x$ of Fig. 2. Fig. 2 is a plan view. Fig. 3 is a cross-section taken on the line $y\,y$ of Fig. 1. Fig. 4 is a cross-section on the line $z\,z$ of Fig. 1.

Similar letters of reference indicate corresponding parts.

A represents a square chopping-box, mounted on a sliding carriage, B, by a central vertical pivot, C, under a vertically-moving cross-head, D, carrying a chopping-blade, E, about as long as the width of the interior of the box, and working down into it suitably for chopping meat therein, the cross-head being worked by a crank-shaft, F, mounted below the platform G, whereon the carriage B rests, and connected to it by the rods H, the said cross-head working on the rods I, or any equivalent supports. The carriage has a ratchet-bar, L, extending along the platform G from one side between two guides, M, with two sets of ratchet-teeth, N O, reversed as to each other. Alongside of this bar is a sliding pawl-block, Q, worked by a connecting-rod, R, and a short crank, S, in the crank-shaft. This block carries a pawl, T, for each set of ratchet-teeth, pointing in opposite directions, and arranged relatively to the teeth, as required, for moving the bar in both directions, one pawl being disconnected when the other is connected. U is a sliding plate, arranged above the ratchet-bar and under the pawls, so as to slide a short distance with the ratchet-bar either way to shift the pawls. V represents two pins, projecting from the side of the ratchet-bar to come against the plate when the chopping-box has moved as far as it is required to, and push the said plate from under one pawl and under the other for reversing the box, whereby the reversing-pawl is allowed to engage with the bar to move it back, and the other is disengaged to allow the return movement. These changes take place each time the box is moved in either direction.

It will also be seen that the two sets of teeth of the ratchet-bar are so arranged relatively to each other that in one movement of the box the knife comes down between the cuts made by it in the other movement, and thus chops twice as fine with teeth of a given pitch as it would if the teeth of both sets coincided with each other in respect of their similar parts.

It will also be seen that this machine insures even and uniform cutting of the meat in all parts of the chopping-box, which cannot be effected by the machines having horizontally-revolving chopping-boxes. This is the essential object of the invention.

Having thus described my invention, I claim as new and desire to secure by Letters Patent—

1. The combination of the vertically-moving chopping-blade, horizontally-moving chopping-box, double reversed ratchet-bar, pawl-slide, pawls, and pawl-shifting-plate, the pawl-slide being operated by the crank-shaft, and the pawl-shifter being worked by the ratchet-bar, all substantially as specified.

2. The combination, with a vertically-moving chopping-blade, of a square horizontally-moving chopping-box, arranged to turn horizontally to present the meat for cross-chopping, substantially as specified.

3. The relative arrangement of the two sets of teeth of the ratchet-bar to cause the blade to strike, in one movement of the box, between the cuts made during the reverse movement, substantially as specified.

JESSE BATTEY.

Witnesses:
C. SEDGWICK,
T. B. MOSHER.